United States Patent [19]

Nason

[11] Patent Number: 5,028,093
[45] Date of Patent: Jul. 2, 1991

[54] PROTECTIVE LUBRICATING CAP

[76] Inventor: Robert A. Nason, P.O. Box 7, R.R. #2, Kaministiquia, Ontario, Canada, P0T 1X0

[21] Appl. No.: 521,491

[22] Filed: May 10, 1990

[30] Foreign Application Priority Data

May 11, 1989 [CA] Canada .................................. 599410

[51] Int. Cl.$^5$ ............................................. F16B 37/14
[52] U.S. Cl. ................................ 301/9 DN; 301/37 S; 411/373; 411/428
[58] Field of Search ............... 301/9 DN, 10 R, 11 R, 301/37 R, 37 S, 108 R, 108 A, 108 S; 411/377, 428, 431

[56] References Cited

U.S. PATENT DOCUMENTS

| | | | |
|---|---|---|---|
| 972,140 | 10/1910 | Adam | 411/377 X |
| 1,254,514 | 1/1918 | Leitman | 301/9 DN |
| 1,324,867 | 12/1919 | Wilson | 411/428 |
| 2,456,234 | 12/1948 | Young | 411/428 X |
| 3,960,047 | 6/1976 | Liffick | 301/111 X |
| 4,787,681 | 11/1988 | Wang et al. | 301/37 S |
| 4,881,783 | 11/1989 | Campbell | 301/37 S |

FOREIGN PATENT DOCUMENTS

| | | |
|---|---|---|
| 3335723 | 4/1985 | Fed. Rep. of Germany ... 301/9 DN |
| 3629271 | 3/1987 | Fed. Rep. of Germany .... 301/37 S |

Primary Examiner—Russell D. Stormer
Attorney, Agent, or Firm—Kenneth M. Garrett

[57] ABSTRACT

A protective cap for wheel nuts of a truck or other vehicle comprises a hollow thimble of rubber or like material having a pad containing at the closed end of the thimble.

10 Claims, 1 Drawing Sheet

PROTECTIVE LUBRICATING CAP

FIELD OF THE INVENTION

This invention relates generally to the field of vehicles. It is particularly described in relation to a device for use with wheeled vehicles, although it is not necessarily restricted thereto.

BACKGROUND OF INVENTION

Wheel nuts of vehicles must be removed at intervals for normal maintenance of the vehicles. Design improvements and material have permitted the intervals to be greatly extended in recent years. Concomitantly there has been an increase in the use of corrosive chemicals for snow and ice removal. Unfortunately the design of wheel lug nuts has not moved apace, with the result that considerable difficulty may be experienced in removing the nuts, and damage to the studs often ensues.

It is an object of my invention to provide a protective cover for wheel nuts and the like.

It is another object of my invention to provide a protective cover for wheel nuts that will provide a protective coating to the wheel nuts and studs.

It is yet another object of my invention to provide a protective cover for wheel nuts that is easy to apply and remove, and yet is retained in position even though subject to considerable physical abuse.

It is a still further object of my invention to provide economic means for the protection wheel nuts.

SUMMARY OF THE INVENTION

In accordance with one aspect of my invention a protective cap for wheel nuts comprises a hollow thimble of resilient material having an open end and a blind end, and a pad of lubricant absorbent material locating within the thimble adjacent the blind end.

Suitably the pad consists of a tubular sleeve lining the thimble. Preferably the thimble will have a regular hexahedral cross section at least in the lower portions thereof adjacent the open end. Suitably the porous material is felt.

In most commercial vehicles the wheel studs will project beyond the wheel nuts, and accordingly for such applications the thimble will preferably have a circular cross-section adjacent the blind end thereof.

Desirably, the resilient material is rubber which may be natural rubber or synthetic rubber. Also desirably the open end of the thimble is surrounded by a radial flange which assists in sealing the protective cap to the wheel, and which still further acts to restrict localized deformation of the thimble adjacent the open end under the influence of centrifugal forces.

Preferably, at least for economic purposes, the protective cover has a relatively uniform and thin wall thickness, typically about one sixteenth of an inch being suitable, although those portions presenting outwardly facing shoulders such as the blind end wall, the radial flange and the transition between the hexahedral and circular portions of the thimble will desirably have an increased thickness, as they tend to be subject to greater impact forces.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
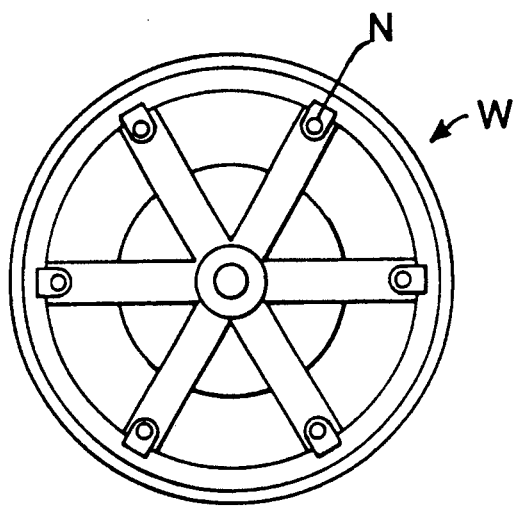
FIG. 1 shows in elevation central portions of a typical wheel installation on a commercial vehicle.
Figure 2:
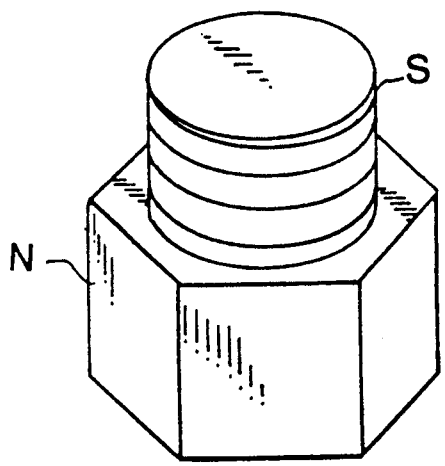
FIG. 2 shows in perspective view a lug nut and stud portion of the wheel installation of FIG. 1 in greater detail.

Referring to the drawings in detail, a typical truck wheel installation is illustrated in FIG. 1 wherein it is identified by the letter W, and is retained in position on wheel studs S by lug nuts N. Typically in medium size equipment the diameter of studs S may be about one inch in diameter and lug nuts N may have a diameter of some one and half inches, but both significantly larger and small sizes will be encountered.

Figure 3:
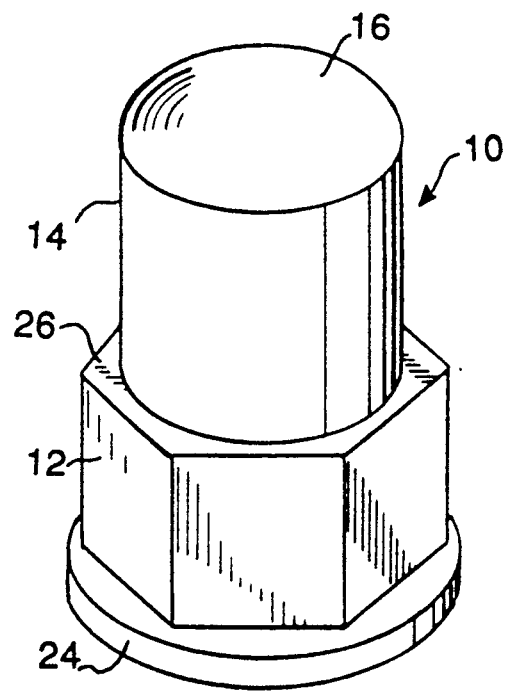
FIG. 3 shows in perspective view from above a protective cap according to the invention suited for use with the wheel installation of FIG. 1.
Figure 4:
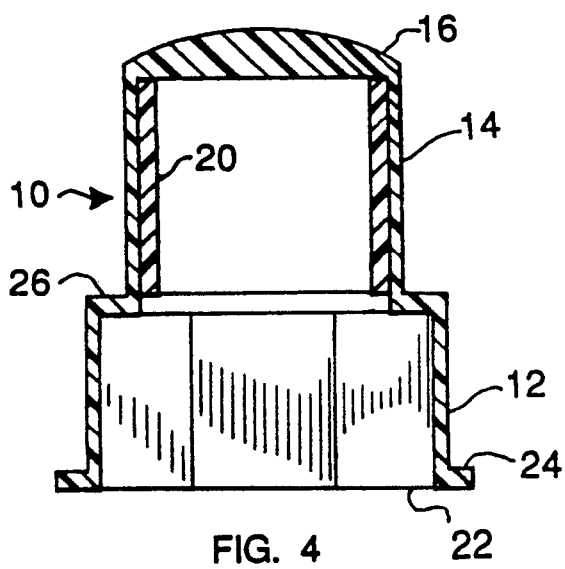
FIG. 4 is a sectional view on line 4—4 of FIG. 3.

A protective cap in accordance with the invention is identified generally in FIGS. 3 and 4 by the numeral 10. Cap 10 is in the form of a thimble and comprises a side wall including a lower portion 12, and an upper portion 14, and a blind end wall 16. Lower portion 12 has a hexahedral cross section, the internal diameter thereof being marginally smaller than that of a standard lug nut to be protected.

Upper portion 14 has a circular cross section having a diameter appreciably greater than that of stud S.

Within upper portion 14 and generally coextensive therewith there is located a sleeve 20 of felt impregnated with a lubricating oil, crank-case oil normally being satisfactory. The internal diameter of sleeve 20 is normally somewhat less than the diameter of stud S, whereby the felt will be compressed when cap 10 is initially engaged on the stud of a wheel, thereby tending to express some of the lubricant absorbed in felt sleeve 20.

The free edge of lower wall portion 12 defines an opening 22 to cap 10, and this is surrounded by a radial flange 24. The flange 24 at least grossly seals against the surface of a wheel to limit the entry of undesirable materials within the confines of cap 10. Flange 24 further tends to limit the stretching of cap 10 in the vicinity of opening 22 under the influence of centrifugal forces.

The dimensions of cap 10 are not critical. Surprisingly it is found that it is not necessary that cap 10 grip nut N or stud S tightly to be retained in position. Wall portions 12 and 14 may be relatively thin walled, although it will be preferred that they be adequate to withstand at least minor impact forces to which the caps will be subject in use. While I do not wish to be bound by theory, it appears that the film of lubricant supplied by caps 10 tends to provide a gas tight seal between the cap and the exterior wall surfaces of nut N, at least when these are in good condition, whereby the axial withdrawal of cap 10 from the nuts acts to create a retaining vacuum within cap 10. I find it desirable that the wall thickness of cap 10 at the closed end 16 thereof be relatively thick, so as to reduce the likelihood of puncture of cap 10. The wall thickness of shoulder portions 26 at the transition of lower portion 12 and upper portion 14 is also preferably increased, as is that of flange 24.

The axial lengths of the upper and lower wall portions of cap 10 are not critical. While the diameters of stud S and lug nut N are standardized the axial lengths thereof are not and at least small variations will be found from one vehicle to another even where studs having the same diameter are used. In general it is preferred that the axial length of wall portions 12, 14 be adequate to permit caps 10 to completely enshroud the lug nuts and studs, as a small axial space is not found to detract from the performance of caps 10.

It will be apparent that many changes may be made to the illustrative embodiment, while falling within the scope of the invention and it is intended that all such changes be covered by the claims appended thereto.

I claim:

1. A protective cap for wheel nuts comprising:
   a hollow thimble of resilient material having an open end and a blind end, said open end being defined in part by an inner wall surface having a hexahedral cross-section;
   said blind end having a reduced diameter in comparison to said open end, and
   a tubular sleeve of lubricant absorbent material generally coextensive with said blind end disposed within said blind end of said thimble wherein said sleeve is of a length to surround a stud extending from said wheel nut.

2. A protective cap as defined in claim 1, wherein said blind end of said thimble has a circular cross section.

3. A protective cap as defined in claim 1, wherein said open end has a small flange extending radially therearound.

4. A protective cap as defined in claim 1, wherein said resilient material is rubber.

5. A protective cap as defined in claim 1, wherein said thimble has an increased wall thickness across said blind end.

6. A protective cap as defined in claim 1, wherein said absorbent material is felt.

7. A protective cap for wheel nuts comprising:
   a hollow thimble of a resilient rubber having an open end and a closed end;
   said open end of said thimble having a complementary shape on the interior thereof to that of a wheel nut to be protected by said cap, and
   a tubular sleeve of absorbent material impregnated with a lubricant disposed within said closed end, and generally coextensive therewith to surround a stud extending from said wheel nut.

8. A protective cap as defined in claim 6, wherein said closed end has a circular cross section.

9. A protective cap as defined in claim 8, wherein said open end is provided with a radially outwardly extending flange therearound.

10. A protective cap as defined in claim 7, wherein said thimble has a wall thickness at portions thereof presenting outwardly facing shoulders greater than at other wall portions thereof.

* * * * *